United States Patent
Cui et al.

(10) Patent No.: US 9,479,683 B2
(45) Date of Patent: Oct. 25, 2016

(54) LIQUID CRYSTAL LENS IMAGING METHOD AND APPARATUS

(71) Applicant: SHENZHEN MERCURY OPTOELECTRONICS RESEARCH INSTITUTE, Shenzhen (CN)

(72) Inventors: Chunhui Cui, Shenzhen (CN); Mao Ye, Shenzhen (CN); Shuda Yu, Shenzhen (CN); Rui Bao, Shenzhen (CN)

(73) Assignee: SHENZHEN MERCURY OPTOELECTRONICS RESEARCH INSTITUTE, Shenzhen (CN)

( * ) Notice: Subject to any disclaimer, the term of this patent is extended or adjusted under 35 U.S.C. 154(b) by 3 days.

(21) Appl. No.: 14/580,964

(22) Filed: Dec. 23, 2014

(65) Prior Publication Data
US 2016/0037024 A1 Feb. 4, 2016

(30) Foreign Application Priority Data

Jul. 29, 2014 (CN) .......................... 2014 1 0367920

(51) Int. Cl.
*H04N 5/217* (2011.01)
*G02F 1/29* (2006.01)

(52) U.S. Cl.
CPC .............. *H04N 5/2173* (2013.01); *G02F 1/29* (2013.01); *G02F 2001/294* (2013.01)

(58) Field of Classification Search
CPC . H04N 5/2173; G02F 1/29; G02F 2001/294; G02B 3/12; G02B 3/14
See application file for complete search history.

(56) References Cited

U.S. PATENT DOCUMENTS

| 2007/0279365 | A1* | 12/2007 | Kageyama | G02B 7/38 345/100 |
| 2010/0201865 | A1* | 8/2010 | Han | H04N 5/23229 348/362 |
| 2011/0043717 | A1* | 2/2011 | Valyukh | G02F 1/29 349/33 |
| 2012/0057070 | A1* | 3/2012 | Park | H04N 5/23212 348/345 |
| 2013/0113889 | A1* | 5/2013 | Chen | H04N 5/2257 348/47 |
| 2014/0009572 | A1* | 1/2014 | Matsumoto | H04N 5/23238 348/36 |

* cited by examiner

*Primary Examiner* — Luong T Nguyen
(74) *Attorney, Agent, or Firm* — Anova Law Group, PLLC

(57) ABSTRACT

The present invention provides a liquid crystal lens imaging apparatus and method. Wherein, the imaging apparatus comprises a lens group including at least a liquid crystal lens, a drive circuit, an image collecting unit and an image processing unit. The drive circuit is connected to the liquid crystal lens to drive the liquid crystal lens respectively into an in-focus state or into an out-of-focus state. The image collecting unit is configured to collect light signal passing through the liquid crystal lens to generate an image. When the liquid crystal lens is in the in-focus state, the image collecting unit generates an in-focus image of the light signal and, when the liquid crystal lens is in the out-of-focus state, the image collecting unit generates an out-of-focus image of the light signal as a reference image. Further, the image processing unit is connected to the image collecting unit to receive both the in-focus image and the reference image, to process the in-focus image using the reference image to generate a processed image, and to deconvolute the processed image to generate a final image.

16 Claims, 4 Drawing Sheets

• Focal point    ▨ Focal area    ☐ Non-focal area

LIQUID CRYSTAL LENS IMAGING METHOD AND APPARATUS

CROSS-REFERENCES TO RELATED APPLICATIONS

This application claims priority of Chinese Patent Application No. 201410367920.7, filed on Jul. 29, 2014, the entire contents of which are incorporated by reference herein.

FIELD OF THE INVENTION

The present invention generally relates to the field of lens imaging technology and, more particularly, to a liquid crystal lens imaging apparatus and method.

BACKGROUND

Due to the anisotropic characteristics of liquid crystal material, a liquid crystal device usually only responds to polarized light. So when a crystal liquid lens is applied or used in an imaging device, a polarizing device such as a polarizing plate or a polarizer is required to polarize incident light. But the use of the polarizing plate or polarizer may lower the light intensity to less than half of the initial incident light intensity. Thus, in a darker or low light environment, there may be not enough light to reach the image sensor, causing decreased signal to noise ratio and lowered image quality.

To avoid the use of the polarizing plate or polarizer, a lens group composed of multiple superimposed liquid crystal lenses with their initial alignment of the liquid crystal layers perpendicular to each other may be used in the imaging system. Or a liquid crystal lens superimposed by multiple liquid crystal layers with their initial alignment perpendicular to each other may be designed for the imaging system. Each liquid crystal lens or each crystal liquid layer processes respectively polarization component of an arbitrary polarization state in two perpendicular directions, thus it can be applied to process arbitrary polarization state. But the solution may have the following problems.

For the solution with multiple superimposed liquid crystal lenses or multiple superimposed liquid crystal layers, due to the increased number of the liquid crystal lenses or liquid crystal layers, the manufacturing cost of the liquid crystal lens may be greatly increased. The increased number of liquid crystal lenses or liquid crystal layers may also greatly increase the thickness of the device, making it difficult for the liquid crystal lens imaging apparatus to be integrated into mobile devices such as mobile phones, tablet computers, etc. Further, because each liquid crystal lens or each liquid crystal layer is located at a different position in the imaging system, the propagation behavior of the two components of the polarized light is not exactly the same, which can reduce the imaging quality of the system.

The disclosed methods and systems are directed to solve one or more problems set forth above and other problems, including how to directly generate high quality images with the liquid crystal lens without the polarizer and to reduce the thickness of the lens structure at the same time.

BRIEF SUMMARY OF THE DISCLOSURE

Directed to solve one or more problems described above, the present invention provides a new liquid crystal lens imaging apparatus and method.

One aspect of the present invention provides a liquid crystal lens imaging apparatus, the apparatus includes a lens group containing at least a liquid crystal lens, a drive circuit, an image collecting unit, and an image processing unit. The drive circuit is connected to the liquid crystal lens to drive the liquid crystal lens respectively into an out-of-focus state or into an in-focus state. The image collecting unit is configured to collect light signal passing through the liquid crystal lens to generate an image based on the light signal. When the liquid crystal lens is in the in-focus state, the image collecting unit generates an in-focus image of the light signal and, when the liquid crystal is in the out-of-focus state, the image collecting unit generates an out-of-focus image of the light signal as a reference image. The image processing unit is connected to the image collecting unit to receive both the in-focus image and the reference image and to process the in-focus image using the reference image to generate a processed image, and the image processing unit is further configured to deconvolute the processed image to generate a final image.

Another aspect of the present invention provides a liquid crystal lens imaging method, the method comprises driving a liquid crystal lens respectively into an out-of-focus state or into an in-focus state, collecting light signal passing through the liquid crystal lens to generate an image based on the light signal, wherein, when the liquid crystal is in the in-focus state, the image collecting unit generates an in-focus image of the light signal, and when the liquid crystal lens is in the out-of-focus state, the image collecting unit generates an out-of-focus image of the light signal as a reference image of the light signal. The method further comprises receiving both the in-focus image and the reference image and processing the in-focus image using the reference image to generate a processed image and deconvoluting the processed image to generate a final image.

Other aspects of the present disclosure can be understood by those skilled in the art in light of the description, the claims, and the drawings of the present disclosure.

DETAILED DESCRIPTION

In order to make the purposes, features and advantages of the present invention to be more clearly understood, the followings together with accompany drawings describe in detail the present invention with specific embodiments. It should be noted that the embodiments and features of the embodiments according to the present invention may be combined with each other whenever there is no conflict.

In the following descriptions, numerous specific details are set forth in order to fully understand the present invention, but the present invention may also be implemented in other ways different from the disclosed embodiments.

Therefore, the present invention is not limited to the specific embodiments disclosed in the following descriptions.

Figure 1:
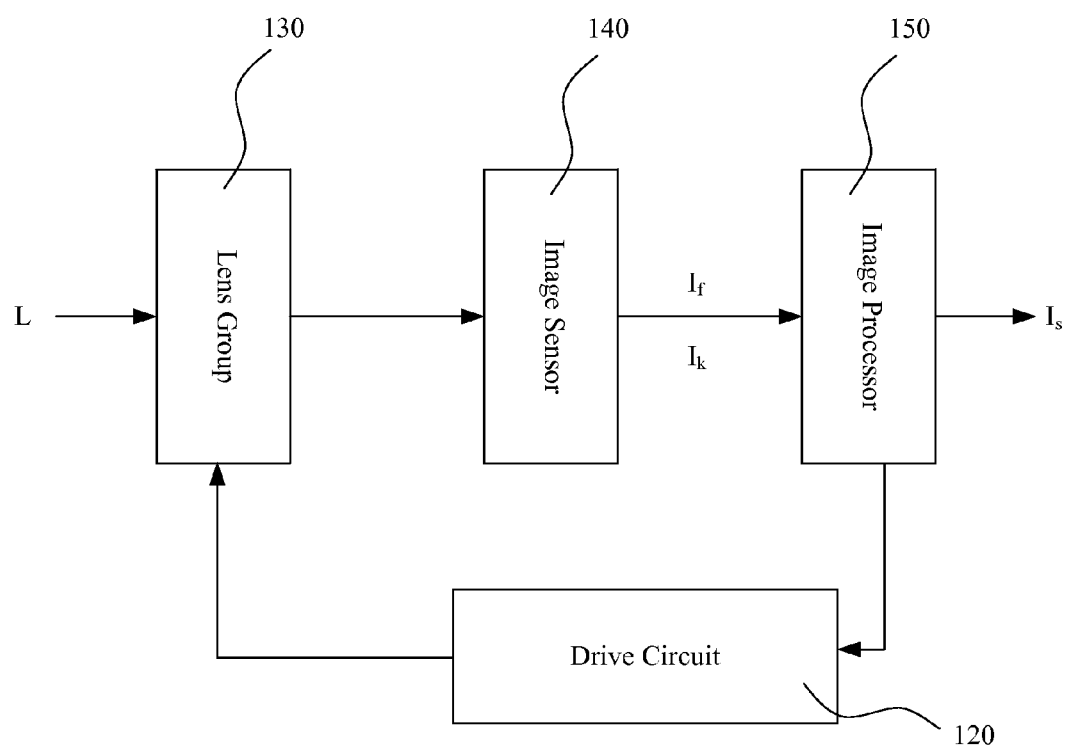
FIG. 1 illustrates a schematic diagram of a liquid crystal lens imaging apparatus according to disclosed embodiments.

FIG. 1 illustrates a schematic diagram of a liquid crystal lens imaging apparatus according to disclosed embodiments.

In general, when without a polarizing device such as a polarizing plate or a polarizer, after original incident light (e.g., sunlight, generally including mixed polarized light of non-single-direction polarization) passes through a liquid crystal lens, in addition to the polarized light component modulated by the liquid crystal lens, the passed-through incident light may also include other mixed polarized light components unmodulated by the liquid crystal lens, which may cause decreased clarity for a final generated image. To solve such problem, the liquid crystal lens imaging apparatus according to the disclosed embodiments, in addition to capturing or obtaining an in-focus image generated in a stable in-focus state, also captures or obtains an out-of-focus image (also known as a defocused image) generated in an out-of-focus state as a reference image (also known as an auxiliary image), and uses the reference image to process the in-focus image to eventually restore a clear and sharp image especially when without using the polarizing device.

As shown in FIG. 1, the liquid crystal lens imaging apparatus includes a lens group 130, an image sensor (image collecting unit) 140, an image processor (image processing unit) 150, and a drive circuit 120. Other components may also be included.

The lens group 130 may include at least a liquid crystal lens. During operation, the lens group 130 may be configured to process and transmit incident light into the liquid crystal lens imaging apparatus. For example, the original incident light L (e.g., sunlight, typically including mixed polarized light with multiple different polarization directions) enters the lens group 130, the image sensor 140 collects light signal passing through the lens group 130, generates an image based on the collected light signal and transmits the generated image to the image processor 150.

The image processor 150 receives and analyzes the image, and outputs a control signal to the drive circuit 120 based on the received image. The drive circuit 120 is connected to the liquid crystal lens of the liquid crystal lens group 130. The drive circuit 120 may adjust a voltage applied on the lens group 130 according to the control signal output from the image processor 150 to change the refractive index of the liquid crystal lens. So that the liquid crystal lens may transit from the out-of-focus state to the in-focus state, or vice versa from the in-focus state to the out-of-focus state. When the lens group (liquid crystal lens) 130 is in the in-focus state, the image sensor 140 generates the in-focus image $I_f$. During a transition from the out-of-focus state to the in-focus state or from the in-focus state to the out-of-focus state, the lens group (liquid crystal lens) 130 is in the out-of-focus state and the image sensor 140 generates at least an out-of-focus image as the reference image $I_r$.

The image processor 150 may be configured to receive the in-focus image $I_f$ and the reference image $I_r$, to use the reference image $I_r$ to remove the interference signal not modulated by the liquid crystal lens in the in-focus image $I_f$ and to increase the proportion of the light component modulated by the liquid crystal lens. Eventually the image processor 150 may restore and obtain the clear and sharp image especially when without using a polarizing device. Thus, a final clear image $I_s$ is generated with the help of the reference image $I_r$, and a high-contrast imaging system can be obtained.

According to above embodiments, the lens group 130 may include at least a liquid crystal lens. When the lens group 130 includes multiple liquid crystal lenses, the multiple liquid crystal lenses are superimposed with their initial alignments parallel to each other, i.e. the rubbing directions of the alignment layers of the multiple liquid crystal lenses are parallel to each other. In addition to the liquid crystal lenses, the lens group 130 may also include other physical optical lenses, such as glass or plastic optical lenses.

Further, the lens group 130 may be implemented in different embodiments by a variety of combinations and compositions, including, but not limited to, any one or more or a combination of the followings: (1) a single crystal liquid lens; (2) a compound-eye array composed of single liquid crystal lens; (3) multiple liquid crystal lenses with their initial alignments parallel to each other; (4) multiple liquid crystal lenses with their initial alignments parallel or a compound-eye array thereof; (5) a combination of a single liquid crystal lens and other optical lenses; (6) a combination of a compound-eye array composed of single liquid crystal lens and other optical lenses; (7) multiple liquid crystal lenses with their initial alignments parallel to each other and other optical lenses; (8) multiple liquid crystal lenses with their initial alignments parallel to each other or a compound-eye array thereof and other optical lenses.

As described above, the lens group 130 and the liquid crystal lens may also be a lens array, but here in the present invention, they are all referred to as the "lens group" and the "liquid crystal lens" without distinction. As functions of the lens group or liquid crystal lens are disclosed in detail, other details of specific implementations of the lens group 130 and the variety of combinations and compositions, as well as its physical optical lenses are omitted here.

In certain embodiments, the lens group 130 may include at least a liquid crystal lens and an optical lens coupled with the liquid crystal lens. The liquid crystal lens of the lens group 130 is placed in front of the optical lens, a specific placement may be adjusted in accordance with its own parameters to form the lens group with the optical lens as a main component and the liquid crystal lens as an auxiliary component. When the original incident light L reaches the optical lens through the liquid crystal lens, the liquid crystal lens and the optical lens, as a whole, modulates the light signal by converging and diverging the incident light. And the image processor 140 generates the in-focus and out-of-focus image.

In certain embodiments, the image processor 150 may be a programmable logic controller. The image processor 150 may include one or more general processor or graphic processor. The image processor 150 may also include other component, such as a storage medium, a display, a communication module, a database, and/or peripherals, etc. Further, the one or more processor can include multiple cores for multi-thread or parallel processing. Storage medium may include memory modules, such as ROM, RAM, flash memory modules, and mass storages, such as CD-ROM and hard disk, etc. Storage medium may store computer programs for implementing various image processing functions, when the computer programs are executed by the processor (i.e., the image processor 150). The peripherals may include various sensors and other I/O devices, such as keyboard and mouse, and communication module may include certain network interface devices for establishing connections through communication networks. Database may include one or more databases for storing certain data and for performing certain operations on the stored data, such as database searching.

Especially without using the polarizing device, the liquid crystal lens imaging apparatus according to the disclosed embodiments may preserve or ensure the light intensity of the original incident light L. Thus, for certain particular image sensors, even in a low light shooting environment, these image sensors may also distinguish more details, enhancing the shooting effect in dark ambient light and further enriching the details of a captured image. In addition, comparing to an optical imaging system constituted by the lens (group) composed of multiple superimposed liquid crystal lenses with their initial alignments perpendicular to each other or multiple superimposed liquid crystal layers, the liquid crystal lens imaging apparatus according to the disclosed embodiments can be made thinner and lighter, and be more suitable for mobile devices such as mobile phones, tablet computers, etc.

The above describes the structure of main components of the liquid crystal lens imaging apparatus according to the present invention and its general operation process. The followings describe in detail the operation principle of the liquid crystal lens imaging apparatus according to the schematic diagram of the liquid crystal lens imaging apparatus shown in FIG. 1. For example, the processing of the in-focus image through the use of the generated out-of-focus images may be described first.

When the lens group 130 is in operation, the liquid crystal lens is driven to a lens state to tune the focus. At the beginning of focusing, the liquid crystal lens imaging apparatus (e.g., the liquid crystal lens) is in an out-of-focus state, so the image sensor 140 generates or captures the reference image $I_r$. The image processor 150 receives and analyzes the out-of-focus image.

When it is determined that the generated or captured image is the out-of-focus image, the image processor 150 outputs a control signal to the drive circuit 120. According to the control signal, the drive circuit 120 adjusts the voltage applied on the liquid crystal lens to continue to tune the focus and to transit the liquid crystal lens from the out-of-focus state to the in-focus state.

After repeated adjustments until the image sensor 140 generates the in-focus image $I_f$, the image processor 150 receives the in-focus image $I_f$ and an imaging process is completed. A next imaging process can be started. During the transition from the out-of-focus state to the in-focus state, the image sensor 140 generates at least one out-of-focus image as the reference image $I_r$. Therefore, the image processor 150 receives the reference image $I_r$ and the in-focus image $I_f$, uses the reference image $I_r$ generated during the focusing process to process the in-focus image $I_f$ to recover the clear image $I_s$. It can be seen that any one of the out-of-focus images generated during the focusing process can be used as the reference image $I_r$ to remove the interference component in the in-focus image $I_f$ to generate the clear image $I_s$.

Without loss of generality, according to the characteristics of the liquid crystal lens that the liquid crystal lens only responds to polarized light, all light components of the original incident light L of multiple polarization directions which can be modulated by the liquid crystal lens are decomposed into one polarization direction, and all light components which cannot be modulated by the liquid crystal lens are decomposed into another polarization direction, and the two polarization directions, represented respectively as x and y, are perpendicular to each other.

The light components of the light signal (the original incident light L) received by the image processor 140 in polarization directions x and y generate two images, represented respectively as $I^x$ and $I^y$. That is an image captured and generated by the image sensor 140 can be represented by two component sub-images as $I^x$ and $I^y$, respectively. It should be noted that the meaning of x and y of present invention is different from the meaning of the coordinates x and y in an image. Not like the traditional coordinates x and y, as used herein, the x and y can be any two perpendicular directions.

Thus, when the drive circuit 120 controls the liquid crystal lens of the lens group 130 to transit from the out-of-focus state to the in-focus state, the reference image $I_r$ generated by the image sensor 140 can be expressed by two component sub-images $I_r^x$ and $I_r^y$ in the following equation:

$$I_r = I_r^x + I_r^y \quad (1)$$

That is, the reference image $I_r$ includes the image $I_r^x$ and $I_r^y$ generated respectively by the light components in polarization direction x and y of the light signal received by the image sensor 140. The light signal in polarization direction y is also known as the interference light signal.

When the liquid crystal lens of the lens group 130 is in a stable in-focus state under the control of the drive circuit 120, the in-focus image $I_f$ generated by the image processor 140 can also be expressed by two component sub-images $I_f^x$ and $I_f^y$ in the following equation:

$$I_f = I_f^x + I_f^y \quad (2)$$

That is, the in-focus image $I_f$ includes the image $I_f^x$ and $I_f^y$ generated by the light components in polarization direction x and y of the light signal received by the image sensor 140. The light signal in polarization direction y is also known as the interference light signal.

Further, when the lens group 130 is not in operation, the liquid crystal lens is in a non-lens state, and the drive circuit 120 does not apply driving voltage on the liquid crystal lens. So the liquid crystal lens does not have modulation effect on the original incident light L. Because the liquid crystal lens imaging apparatus does not use the polarizing device such as polarizing plate or polarizer, the x component and y component of the original incident light L can pass the liquid crystal lens without any changes.

When the lens group 130 is in operation, the drive circuit 120 applies driving voltage on the liquid crystal lens to render the liquid crystal lens in lens state, and the polarized light modulated by the liquid crystal lens generates the image on the image sensor 140. The liquid crystal lens only have modulation effect on the light signal in polarization direction x of the original incident light L by converging and diverging the light, and the light signal on the perpendicular polarization direction y can pass through the lens group 130 without being modulated.

By using the reference image $I_r$ generated during the focusing process, the in-focus image $I_f$ is processed based on the following equation to obtain a clear image $I_n$:

$$I_n = I_f - I_r = I_f^x + I_f^y - I_r^x - I_r^y \quad (3)$$

As long as the liquid crystal lens responds to the voltage quickly enough, a transition time from the out-of-focus state corresponding to the reference image $I_r$ to the in-focus state corresponding to the in-focus image $I_f$ is short enough, i.e. a time interval between the out-of-focus state and the in-focus state is less than a preset time interval. Thus, a shooting scene does not change significantly (e.g. change on the light intensity, movement of objects in the scene and movement of the imaging apparatus, etc.). Thus, it is reasonable to assume that there is no change occurred for the original incident light L in the two states (out-of-focus state and in-focus state), or the changes occurred are minor enough to be ignored. And for $I_r^y$ and $I_f^y$, since the liquid crystal lens does not have modulation effect on the light component in polarization direction y in the two states, so the following equation can be obtained:

$$I_f^y = I_r^y \quad (4)$$

And substituting equation (4) into equation (3) can obtain the following equation:

$$I_n = I_f^x - I_r^x \quad (5)$$

From the above equation (3)-(5), it can be known that the processing of the in-focus image $I_f$ and the reference image $I_r$ is to use the reference image $I_r$ to remove the image $I_f^y$ generated by the interference light signal unmodulated by the liquid crystal lens from the in-focus image $I_f$ and to use the image $I_r^x$ generated by the light signal modulated by the liquid lens to process the image $I_f^x$ generated by the light signal modulated by the liquid crystal lens in the in-focus image $I_f$.

Specifically, it is to obtain a difference between the in-focus image $I_f$ and the reference image $I_r$ by minus the reference image $I_r$ from the in-focus image $I_f$, which is to minus the image $I_r^y$ generated by the interference light signal unmodulated by the liquid crystal lens in the reference image $I_r$ from the image $I_f^y$ generated by the interference light signal unmodulated by the liquid crystal lens in the in-focus image $I_f$ to remove the image $I_f^y$, and to minus the image $I_r^x$ generated by the light signal modulated by the liquid crystal lens in the reference image $I_r$ from the image $I_f^x$ generated by the light signal modulated by the liquid crystal lens in the in-focus image $I_f$. For a given pixel, the above calculation is to obtain a gray value difference of the pixel.

For a particular focal plane, $I_f^x$ also represents a clear in-focus image and $I_r^x$ represents a blur out-of-focus image.

Under ideal imaging condition, according to the liquid crystal lens imaging apparatus of the present invention, there exists a following relationship between the in-focus image $I_f$ generated in the in-focus state and the reference image $I_r$ generated in the out-of-focus state: $I_r^x$ is the result of convolution of $I_f^x$ and a blurring function h.

Because the actual imaging is also affected by the system noise of the liquid crystal lens imaging apparatus according to the present invention, if the system noise is expressed by n, then the above relationship can be expressed in the following equation:

$$I_r^x = I_f^x * h + n \quad (6)$$

Where * represents the convolution operator, h represents the blurring function, also known as the point spread function, PSF in short, representing an image of a point light source generated by the liquid crystal lens imaging apparatus of the present invention.

According to equation (6), when the blurring function h is determined, the clear image $I_f^x$, which is the image generated by the light signal modulated by the liquid crystal lens in the in-focus image $I_f$, can be obtained with good quality by deconvolution.

Thus, substituting equation (6) into equation (5) obtains:

$$I_n = I_f^x - I_r^x * h - n = I_f^x * \delta - I_r^x * h - n = I_f^x * (\delta - h) + n \quad (7)$$

Where n represents the system noise of the liquid crystal lens imaging apparatus according to the present invention, it may be an additive zero-mean random noise in preferred embodiments. There is no essential difference between the plus and minus sign in front of the noise n, so "+" is used in equation (7). δ represents an impulse response. h represents the blurring function, which may be any appropriate predetermined blurring function, such as the pill box model blurring function:

$$h(u, v) = \frac{1}{4\pi r^2} \Pi\left(\sqrt{u^2 + v^2}\right) \quad (8)$$

Where u represents a horizontal coordinate of the out-of-focus image, v represents a vertical coordinate of the out-of-focus image, r represents a radius of a blur circle of the out-of-focus image, and with $$\Pi\left(\sqrt{u^2 + v^2}\right) = \begin{cases} 1, & \sqrt{u^2 + v^2} < r \\ 0, & \sqrt{u^2 + v^2} \geq r \end{cases}.$$

After the blurring function h is determined, a predetermined deconvolution algorithm, such as a Richardson-Lucy algorithm, may be used to obtain the target (desired) image $I_f^x$.

Through the deconvolution processing according to equation (7), the image $I_f^x$ generated by the light signal modulated by the liquid crystal lens in the in-focus image $I_f$, which is also the to-be-obtained clear image $I_s$, can be restored from the new image $I_n = I_f - I_r$.

The radius r in equation (8) can be calculated in the following way. If the lens group 130 is equivalent to a single equivalent lens 220, which is to regard the liquid crystal lens and the coupled optical lens as an integral lens, the liquid crystal lens imaging apparatus according to the present invention can be illustrated in FIG. 2 when the liquid crystal lens imaging apparatus is in the in-focus state.

Figure 2:
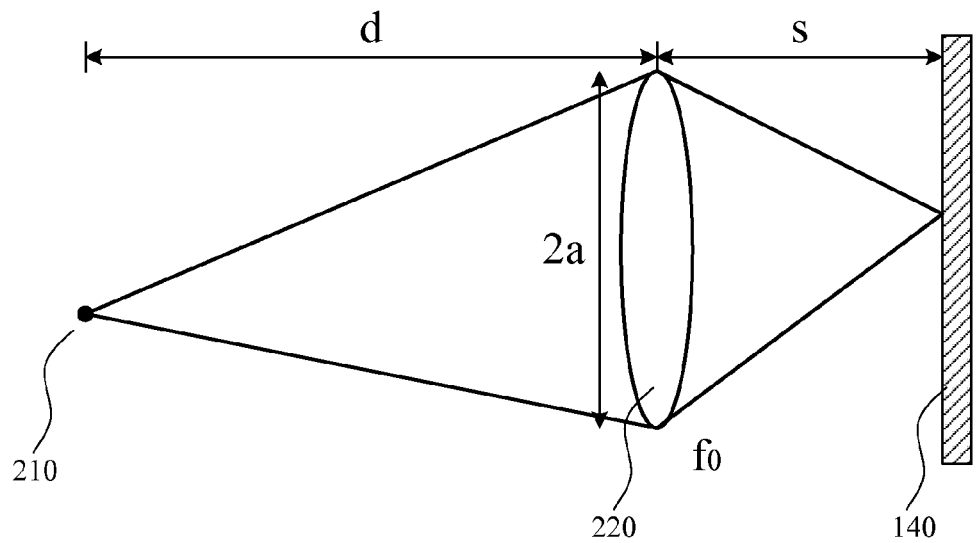
FIGS. 2-4 illustrate optical imaging paths of a lens group in a liquid crystal lens imaging apparatus as an equivalent lens according to disclosed embodiments.

As shown in FIG. 2, the lens group (i.e., the equivalent lens 220) is coupled to the image sensor 140, and an arbitrary object point 210 is in space in front of the equivalent lens 220. The light emitted or reflected from the object point after being tuned by the equivalent lens 220 is converged to a point on the image sensor 140. In other words, the imaging apparatus is focused on the object point 210. At this time, the equivalent lens 220 is focused on a focal plane of the object point 210.

At this moment, as shown in FIG. 2, let $f_0$ be the equivalent focal length of the equivalent lens 220, let d be the distance between the object point 210 and the equivalent lens 220, i.e., the object distance, and let 's' be the distance between the equivalent lens 220 and the image sensor 140, i.e., the image distance, according to the object and image relationship, the follow equation can be obtained:

$$\frac{1}{d} + \frac{1}{s} = \frac{1}{f_0} \quad (9)$$

During the focusing process of the liquid crystal lens imaging apparatus, the voltage applied on the liquid crystal lens of the lens group 130 is changed by the drive circuit 120, so that the refractive index of the liquid crystal lens is changed, which results in the change of the equivalent focal length $f_0$ of the equivalent lens 220, and eventually the disclosed liquid crystal lens imaging apparatus is transited to the in-focus state as shown in FIG. 2.

During the focusing process for the imaging of the object point 210, before the liquid crystal lens is transited to the in-focus state shown in FIG. 2, the liquid crystal lens is in the out-of-focus state. At this time, light emitted or reflected from the object point 210 cannot be converged at a point on the image processor 140, instead the light after being tuned by the equivalent lens 220 forms a near circular spot (hereinafter referred to as the blur circle of the out-of-focus image), and generates the out-of-focus image. Depending on the different positions of the convergence point located in front of or behind the image sensor 140, there are two types of out-of-focus states illustrated respectively in FIG. 3 and FIG. 4.

Figure 3:
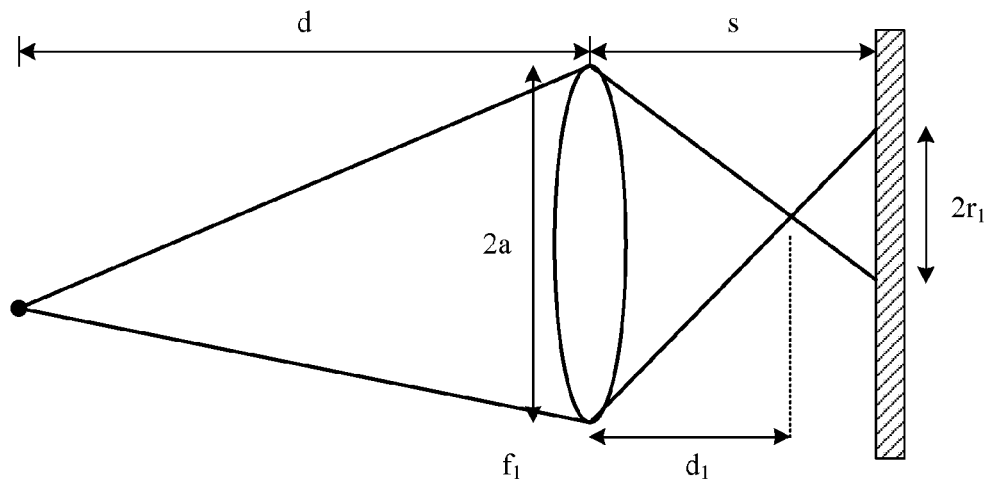

As shown in FIG. 3, the light emitted or reflected from the object point 210 is converged in front of the image sensor 140. Let $d_1$ be the distance between the light convergence point and the equivalent lens 220, let $f_1$ be the focal length of the equivalent lens 220, and assuming that the distance d between the object point 210 and the equivalent lens 220 is not changed, according to the image and object relationship, the following equation exists:

$$\frac{1}{d} + \frac{1}{d_1} = \frac{1}{f_1} \quad (10)$$

Associating equation (10) with equation (9), the following equation can be obtained:

$$\frac{1}{d_1} = \frac{1}{s} + \frac{1}{f_1} - \frac{1}{f_0} \quad (11)$$

Let $r_1$ be the radius of the blur circle of the image generated on the image sensor 140, let 2a be the aperture of the equivalent lens 220 (when an aperture stop is used in the equivalent lens, the aperture is an inner diameter of the aperture stop). During the focusing process, the aperture 2a of the equivalent lens 220 and the distance s between the equivalent 220 and the image sensor 140 are not changed. According to the geometric relationship between similar triangles, the following equation is obtained:

$$\frac{s - d_1}{d_1} = \frac{2r_1}{2a} \quad (12)$$

And the radius $r_1$ of the blur circle of the out-of-focus image generated on the image sensor 140 is:

$$r_1 = \frac{a}{d_1}(s - d_1) \quad (13)$$

Substituting equation (11) into equation (13) obtains the following equation:

$$r_1 = a\, s\left(\frac{1}{f_1} - \frac{1}{f_0}\right) \quad (14)$$

Figure 4:
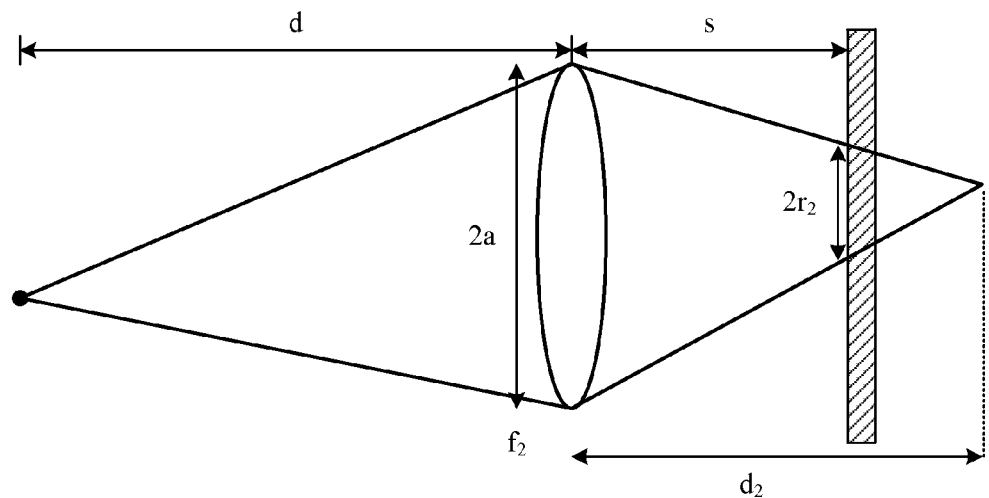

As shown in FIG. 4, the light emitted or reflected from the object point 210 is converged behind the image sensor 140. At this time, let $d_2$ be the distance between the light convergence point and the equivalent lens 220, let $f_2$ be the focal length of the equivalent lens 220, also assuming that the distance d between the object point 210 and the equivalent 220 is not changed, according to the image and object relationship, the following equation is obtained:

$$\frac{1}{d} + \frac{1}{d^2} = \frac{1}{f_2} \quad (15)$$

Associating equation (15) with equation (9) obtains the following equation:

$$\frac{1}{d_2} = \frac{1}{s} + \frac{1}{f_2} - \frac{1}{f_0} \quad (16)$$

Let $r_2$ be the radius of the blur circle of the image generated on the image sensor 140. As above, assuming that the aperture 2a of the equivalent lens 220 and the distance s between the equivalent lens 220 and the image sensor 140 are not changed during the focusing process, according to the geometric relationship between similar triangles, the following equation is obtained:

$$\frac{d_2 - s}{d_2} = \frac{2r_2}{2a} \quad (17)$$

And the radius $r_2$ of the blur circle of the out-of-focus image generated on the image sensor 140 is expressed as:

$$r_2 = \frac{a}{d_2}(d_2 - s) \quad (18)$$

Substituting equation (16) into (18) may obtain the following equation:

$$r_2 = as\left(\frac{1}{f_0} - \frac{1}{f_2}\right) \quad (19)$$

According to equation (14) and (19), the following unified equation can be derived:

$$r = as\left|\frac{1}{f} - \frac{1}{f_0}\right| \quad (20)$$

Where f represents the equivalent focal length of the equivalent lens in any out-of-focus state, r represents the radius of the blur circle of the out-of-focus image generated in the out-of-focus state corresponding to the equivalent focal length f. It can be seen that a spot size of the out-of-focus image generated on the image sensor 140 in any out-of-focus state can be calculated by the equation (20).

According to the disclosed liquid crystal lens imaging apparatus, focusing is achieved by changing the refractive index of the liquid crystal lens, rather than by adjusting the distance (i.e. the distance s as shown in FIG. 2) between the lens and the image sensor 140 through a motor in a conventional optical imaging system. Thus, the distance between the lens group 130 and the image sensor 140 is not changed during the focusing process of the liquid crystal lens imaging apparatus according to present invention. That is, during the entire focusing process (including the three scenarios illustrated respectively in FIGS. 2, 3 and 4), the distance s between the equivalent lens 220 and the image sensor 140 is fixed. At the same time, it is reasonable to assume that the distance d between the object point 210 and the equivalent lens 220 is kept constant during the entire focusing process.

When all object points in a shooting scene are located at the same focal plane, all object points 210 have the same object distance d. When the disclosed liquid crystal lens imaging apparatus is focused on the focal plane, the equivalent focal length is $f_0$, and the image sensor 140 generates the in-focus image $I_f$. When the disclosed liquid crystal lens imaging apparatus is in out-of-focus state, the equivalent focal length is f, and the image sensor 140 generates the out-of-focus image $I_r$. Because all the object points 210 have the same object distance d, it is necessary to ensure that the two time or moment at which the in-focus image and the out-of-focus image are generated respectively is very close, i.e. a transition time from the out-of-focus state corresponding to the reference image $I_r$ to the in-focus state corresponding to the in-focus image $I_f$ is short enough, or in other words, a time interval between the in-focus state and the out-of-focus state is less than a preset time interval, then the radii r of the blur circles of the out-of-focus image generated by all the object points 210 in out-of-focus state are equal.

Then in the condition that the half-aperture a of the equivalent lens, the focal length $f_0$, the equivalent focal length f and the distance s between the equivalent lens 220 and the image sensor 140 are all known or determined, the radii r of the blur circles can be uniquely determined by equation (20). The blurring function h is uniquely determined according to equation (8), and the blurring function h is spatially constant. It can be seen that, since all the object points 210 have the same object distance d and the radii r of the blur circles of the out-of-focus image generated in out-of-focus state are equal, then the blurring function h is identical to all pixels and is uniquely determined.

Thus, the radii r of the blur circles of the out-of-focus image can be first determined through equation (20), the blurring function h is then determined. And finally through the deconvolution processing according to equation (14), the clear image $I_f^x$, which is the to-be-obtained clear image $I_s$, can be restored or recovered from the new image $I_n = I_f - I_r$. The blurring function h may be determined by equation (8), it may also be determined through other blurring models, the present invention does not impose any restriction on this. Further, the deconvolution processing on the new image $I_n = I_f - I_r$, in addition to the previously described, may have other methods. The present invention does not impose any restriction on this either.

In a traditional liquid crystal lens imaging system, the polarizing device is placed in front of the liquid crystal lens. Thus, only the light signal polarized in a specific polarization direction can pass through the polarizing device to be converged or diverged by the liquid crystal lens, the light signal polarized in other polarization directions are all masked or blocked by the polarizing device, it implies that the intensity of the light signal is greatly reduced after passing through the polarizing device. When the light signal received by the image sensor is very weak, the induced image is also weak, it may even produce the situation that the intensity of the received light signal is lower than the intensity of the noise, resulting in loss of image details when shooting in low light environment. Although the image quality may be partly compensated through post-processing, but the image quality cannot be fully recovered. In addition, the traditional liquid crystal lens imaging system adopts the solution of multiple superimposed liquid crystal lenses before adding the polarizing device, which increases the thickness of the entire liquid crystal lens imaging system, does not meet the requirements of lightweight devices.

The disclosed liquid crystal lens imaging apparatus does not use the polarizing device, so the light signal after passing through the liquid crystal lens retains the energy in all polarization directions and the intensity of the light signal does not change. Thus, it is much easier for the image sensor 140 to detect or sense subtle changes of the light signal and to further enrich details of the generated image. And the final clear image generated with the help of the out-of-focus image generated during the focusing process is much sharper and has much higher imaging contrast. In addition, the liquid crystal lens imaging apparatus according to the present invention can be made much thinner and lighter, more suitable for mobile devices such as mobile phones and tablet computers, etc., and can effectively improve shooting effect in low light environment.

For images with a single focal plane, the images can be processed sufficiently according to the embodiments described above. But in actual image shootings, since different objects are on different focal planes, and only a certain focus point can be specified, and objects focused on the same focal plane of the specified focus point can be focused and imaged. Thus, on the same image generated, the objects on the focal plane produce clear images, and other objects not on other focal planes produce blur images.

Figure 5:
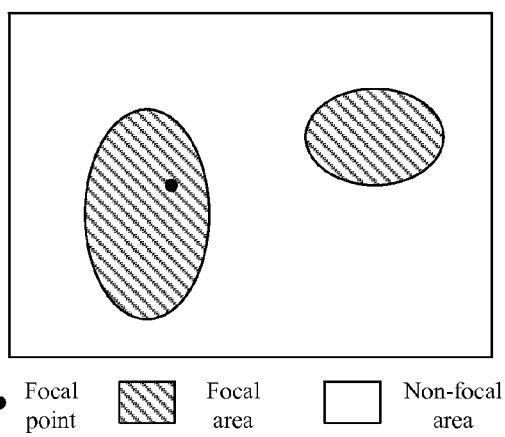
FIG. 5 illustrates an exemplary image with focal areas and non-focal areas according to the disclosed embodiments.

As shown in FIG. 5, an image area located at the same focal plane of the specified focus point is called a focal area $S_f$, while an image area outside the focal area $S_f$ is called a non-focal area $\overline{S_f}$, i.e. the image area corresponding to a nonfocal plane. The image processor 150 only processes the image on the focal area $S_f$ according to the embodiments disclosed above, and does not process the image on the non-focal area $\overline{S_f}$. After the above process, the image on the focal area $S_f$ becomes much clear. For the nonfocal area $\overline{S_f}$, due to the existence of the interference light signal unmodulated by the liquid crystal lens (e.g. the component y signal), the image on the non-focal area $\overline{S_f}$ is much blurred than the image captured by an ordinary camera. The processing may include the followings.

(1) Based on the specified focus point, an in-focus image is generated and a reference image is generated. The specifics may refer to the corresponding description disclosed in the above embodiments, the details are not repeated hereafter.

(2) By analyzing the sharpness of the image, the focal area located at the same focal plane of the specified focus point is obtained from the in-focus image, and the focal area of the in-focus image is processed based on the image area corresponding to the focal area of the in-focus image in the reference image. That is, to process the focal area $S_f$ according to the equation (7) to obtain the clear image $I_f^x$ based on the specified focus point, i.e. to obtain the image $I_s$, and not to perform any processing on the non-focal area $\overline{S_f}$.

Thus, it can ensure that the image area with the same focal plane of the specified focus point is clear and the image has better quality. And not to perform any processing on other non-focal area maintains the polarized signal unmodulated by the liquid crystal lens, so that it may produce the much blurred effect on the image than the one captured by the ordinary camera.

Further, the processing of the in-focus image using out-of-focus images generated after focus is described below.

When the lens group 130 in operation, the liquid crystal lens is driven to the lens state. When the liquid crystal lens imaging apparatus (e.g., the liquid crystal lens) is in focus, the image sensor 140 generates or captures the in-focus image. The image processor 150 receives and analyzes the in-focus image. When the image processor 150 determines that the generated image is the in-focus image, the image processor 150 sends a control signal to the drive circuit 120.

According to the control signal, the drive circuit 120 adjusts the voltage applied on the liquid crystal lens and drives the liquid crystal lens to transit from the in-focus state to the out-of-focus state. When the liquid crystal lens is in the out-of-focus state, the image sensor 140 generates at least one out-of-focus image as the reference image $I_r$. Thus, the image processor 150 receives the reference image $I_r$ and the in-focus image $I_f$, and uses the reference image $I_r$ generated after focus to process the in-focus image $I_f$. The image processor 150 further deconvolutes a processed image to obtain the clear image $I_f^x$, which is the to-be-obtained image $I_s$. The specific process is identical to the process disclosed in the above embodiments, the details may refer to the above descriptions, and are not repeated hereafter.

Further, the reference image $I_r$ may be captured when the liquid crystal lens is in lens state (working state), may also be captured when the liquid crystal lens is in non-lens state (non-working state).

Figure 6:
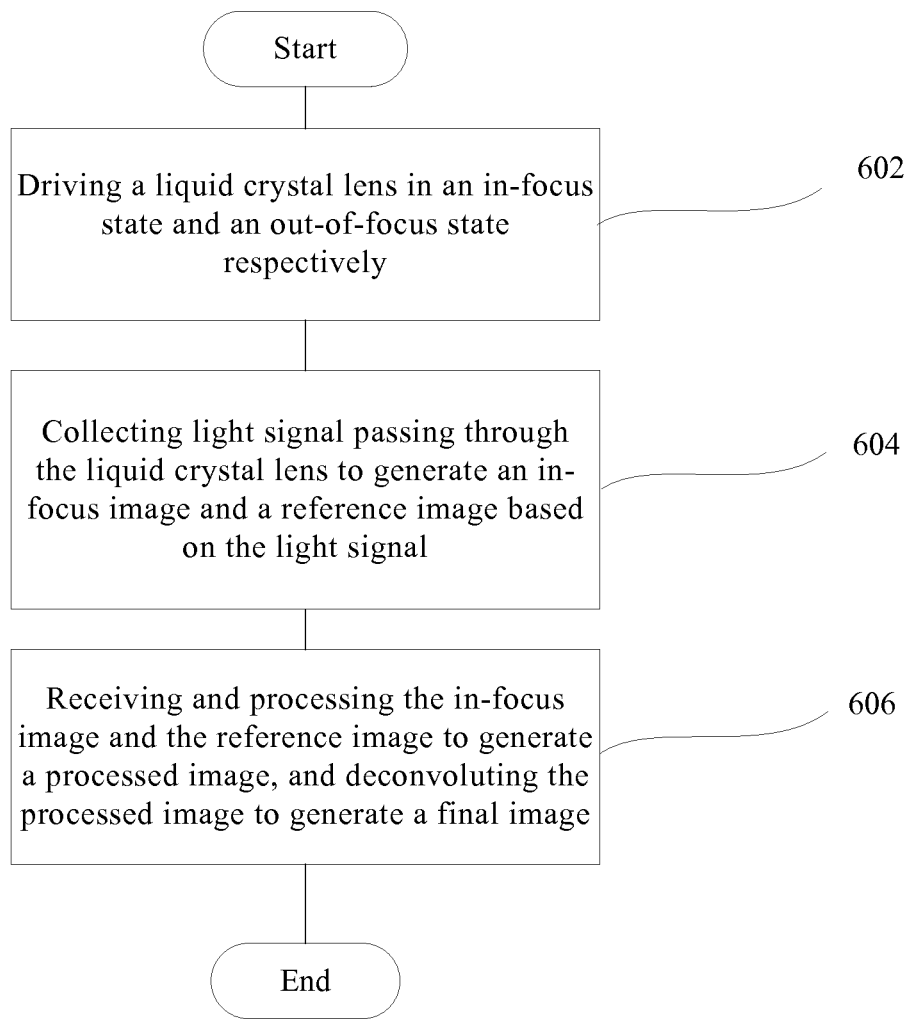
FIG. 6 illustrates a flow chart of a liquid crystal lens imaging method according to disclosed embodiments.

FIG. 6 illustrates a flow chart of a liquid crystal lens imaging method according to the disclosed embodiments. As shown in FIG. 6, the liquid crystal lens imaging method comprises the following steps.

Step 602, the liquid crystal lens is driven to be in the in-focus state and out-of-focus state respectively.

Step 604, the light signal passing through the liquid crystal lens is collected to generate an image. When the liquid crystal lens is in the in-focus state, the light signal generates an in-focus image. And when the liquid crystal lens is in the out-of-focus state, the light signal generates a reference image.

Step 606, the in-focus image and the reference image are received and processed, and a processed image is further deconvoluted.

Thus, especially when without using a polarizing device, the liquid crystal lens imaging apparatus can reduce the thickness of the device structure, making the system more compact. And in order to still obtain high quality image especially when without using the polarizing device, based on above disclosed methods, the liquid crystal lens imaging apparatus also obtains the reference image in the out-of-focus state before or after focus, in addition to obtaining the in-focus image generated when the liquid crystal lens is in the stable in-focus state. The disclosed liquid crystal lens imaging apparatus uses the reference image to process the in-focus image, and deconvolutes the processed image to obtain a clear generated image.

According to the technical solutions disclosed above, processing the in-focus image and the reference image and deconvoluting the processed image specifically includes using the reference image to remove the image generated by the interference light signal unmodulated by the liquid crystal lens in the in-focus image.

According to any one of the technical solutions disclosed above, processing the in-focus image and the reference image and deconvoluting the processed image also includes using the image generated by the light signal modulated by the liquid crystal lens in the reference image to process the image generated by the light signal modulated by the liquid crystal lens in the in-focus image.

After the above processing, the interference signal is removed from the in-focus image. And by using the image generated by the light signal modulated through the liquid crystal lens in the reference image to process the image generated by the light signal modulated through the liquid crystal lens in the in-focus image and by deconvoluting the processed image, an image with higher contrast can be obtained.

According to any one of the technical solutions disclosed above, processing the in-focus image, the processed image is deconvoluted in the following equation:

$$I_f - I_r = I_f^x * (\delta - h) + n \qquad (21)$$

Wherein, $I_f^x$ represents the to-be-obtained image, which is the image generated by the light signal modulated by the liquid crystal lens, $I_f$ represents the in-focus image, $I_r$ represents the reference image, * represents the convolution operator, $\delta$ represents an impulse response, h represents the blurring function, n represents the system noise of the liquid crystal lens imaging system.

In certain embodiments, the reference image is the out-of-focus image generated when the liquid crystal lens is in the lens state, and the blurring function h is determined by the following equation:

$$h(u, v) = \frac{1}{4\pi r^2} \prod \left( \sqrt{u^2 + v^2} \right). \qquad (22)$$

Where u represents a horizontal coordinate of the out-of-focus image, v represents a vertical coordinate of the out-of-focus image, r represents a radius of a blur circle of the out-of-focus image, and with $$\Pi\left(\sqrt{u^2 + v^2}\right) = \begin{cases} 1, & \sqrt{u^2 + v^2} < r \\ 0, & \sqrt{u^2 + v^2} \geq r \end{cases}.$$

And, when the lens group is equivalent to an equivalent lens, the radius r of the blur circle of the out-of-focus image is determined by the following equation:

$$r = as \left| \frac{1}{f} - \frac{1}{f_0} \right| \qquad (23)$$

Where 2a represents the aperture of the equivalent lens, s represents the distance between the equivalent lens and the image collecting unit, $f_0$ represents the equivalent focal length of the equivalent lens for the in-focus image, and f represents the equivalent focal length of the equivalent lens for the out-of-focus image.

According to any one of the technical solutions disclosed above, a time interval between the out-of-focus state of the liquid crystal lens corresponding to the reference image and the in-focus state of the liquid crystal lens corresponding to the in-focus image is less than a preset time interval. Thus, it can ensure that there is no change occurred for the incident light L or the changes occurred are minor enough to be ignored.

According to any one of the technical solutions disclosed above, when the in-focus image is generated based on a specified focus point, a focal area located at the same focal plane of the specified focus point in the in-focus image is obtained by analyzing the sharpness of the image, and the focal area of the in-focus image is processed by using an image area corresponding to the focal area of the in-focus image in the reference image.

Such processing can ensure that the image area located at the same focal plane of the specified focus point is clear, the generated image has higher quality. And not to process other non-focal area maintains the polarized signal unmodulated by the liquid crystal lens. Thus, it may produce a much blurred effect on the image than the one captured by an ordinary camera.

It can be known from above description that, according to the liquid crystal lens imaging method of the present invention, a single liquid crystal lens is used to generate images, which reduces the thickness of the liquid crystal lens structure, making the entire system more compact. And the intensity of incident light is preserved or maintained, which enriches the detail of images shot or captured even in low light environment, obtaining high quality images after processing.

Further, it should be noted that, although the description of the present invention describes successively and respectively the in-focus image and reference image under different conditions, it does not represent or indicate any chronological order on the generating of the in-focus image and the reference image (or the reference image and the in-focus image). It is only for better understanding and explaining more intuitively and clearly the principle of the present invention together with specific circumstances. As described above, the image generated in out-of-focus state before focus state may be referred to as the reference image (i.e. out-of-focus image). The image generated in out-of-focus state after focus state may also be referred to as the reference image (i.e. out-of-focus image). And the image generated in non-lens state may further be referred to as the reference image (i.e. out-of-focus image). In practice, the in-focus image and the in-focus state are related to a predetermined judging standard. So the "in-focus image", the "reference image (i.e. out-of-focus image)" and "in-focus state", "out-of-focus state" are all relative terms. Thus, any processing method of the "in-focus image" (i.e. target image) generated by the liquid crystal lens in "in-focus state" by using the "reference image" (i.e. auxiliary image) generated by the liquid crystal lens in "out-of-focus state", regardless of the generating sequence of the "in-focus image" and the "reference image", should fall within the protection scope of the present invention. In addition, the incident light entering the lens group 130 may be also light with single-direction polarization.

The above only describes certain embodiments of the present invention, it does not constitute any limit to the present invention. For those skilled in the art, the present invention may have various modifications and changes, such as processing the in-focus image through the use of the out-of-focus images generated after focus state. Within the spirit and principles of the present invention, any modifications, equivalent replacement, and improvement, etc., should be included within the protection scope of the present invention.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

According to the liquid crystal lens imaging method of the present invention, a single liquid crystal lens is used to generate images, which reduces the thickness of the liquid crystal lens structure, making the entire system more compact. And the intensity of incident light is preserved or maintained, which enriches the detail of images shot or captured even in low light environment, obtaining high quality images after processing. The incident light can have multiple polarizing directions or can have a single polarizing direction.

What is claimed is:

1. A liquid crystal lens imaging apparatus, comprising:
a lens group including at least one liquid crystal lens;
a drive circuit connected to the at least one liquid crystal lens to drive the at least one liquid crystal lens into an out-of-focus state or into an in-focus state;
an image sensor configured to collect light signal passing through the at least one liquid crystal lens and to generate an image according to the light signal, wherein, when the at least one liquid crystal lens is in the in-focus state, the image sensor generates an in-focus image of the light signal and, when the at least one liquid crystal lens is in the out-of-focus state, the image sensor generates at least one out-of-focus image of the light signal as a reference image; and
an image processor connected to the image sensor to receive both the in-focus image and the reference image, to process the in-focus image using the reference image to generate a processed image, and to deconvolute the processed image to generate a final image, based on:

$$I_f - I_r = I_f^x * (\delta - h) + n$$

wherein, $I_f^x$ represents the final image, $I_f$ represents the in-focus image, $I_r$ represents the reference image, * represents the convolution operator, $\delta$ represents an impulse response, h represents a blurring function and n represents a system noise of the at least one liquid crystal lens imaging apparatus.

2. The liquid crystal lens imaging apparatus according to claim 1, wherein, to process the in-focus image using the reference image, the image processor is further configured to:
use the reference image to remove an image generated by interference light signal unmodulated by the at least one liquid crystal lens in the in-focus image.

3. The liquid crystal lens imaging apparatus according to claim 2, wherein, to process the in-focus image using the reference image, the image processor is further configured to:
use an image generated by the light signal modulated by the at least one liquid crystal lens in the reference image to process an image generated by the light signal modulated by the at least one liquid crystal lens in the in-focus image.

4. The liquid crystal lens imaging apparatus according to claim 1, wherein, the reference image is the at least one out-of-focus image generated by the at least one liquid crystal lens in a lens state, and the blurring function h is determined based on:

$$h(u, v) = \frac{1}{4\pi r^2} \prod \left( \sqrt{u^2 + v^2} \right)$$

wherein, u presents a horizontal coordinate of the out-of-focus image, v represents a vertical coordinate of the at least one out-of-focus image, r presents a radius of a blur circle of the at least one out-of-focus image, and with $$\Pi\left(\sqrt{u^2+v^2}\right) = \begin{cases} 1, & \sqrt{u^2+v^2} < r \\ 0, & \sqrt{u^2+v^2} \geq r \end{cases}.$$

5. The liquid crystal lens imaging apparatus according to claim 4, wherein, when the lens group is equivalent to an equivalent lens, the radius r of the blur circle of the at least one out-of-focus image is determined based on:

$$r = as\left|\frac{1}{f} - \frac{1}{f_0}\right|$$

wherein, 2a represents an aperture of the equivalent lens, s represents a distance between the equivalent lens and the image collecting unit, $f_0$ represents an equivalent focal length of the equivalent lens when the in-focus image is generated, f represents an equivalent focal length of the equivalent lens when the at least one out-of-focus image is generated.

6. The liquid crystal lens imaging apparatus according to claim 1, wherein a time interval between the out-of-focus state of the liquid crystal lens corresponding to the reference image and the in-focus state of the liquid crystal lens corresponding to the in-focus image is less than a preset time interval.

7. The liquid crystal lens imaging apparatus according to claim 1, further comprising an optical lens coupled with the at least one liquid crystal lens.

8. The liquid crystal lens imaging apparatus according to claim 7, wherein, the lens group includes multiple liquid crystal lenses with initial alignments of the multiple liquid crystal lenses parallel to each other.

9. The liquid crystal lens imaging apparatus according to claim 1, wherein, when the in-focus image is generated based on a specified focus point, the image processor determines the in-focus image according to sharpness of the image to obtain a focal area located at a same focal plane of the specified focus point, and to use an image area corresponding to the focal area of the in-focus image in the reference image to process the focal area of the in-focus image.

10. A liquid crystal lens imaging method, comprising:
    driving a liquid crystal lens respectively into an out-of-focus state or into an in-focus state;
    collecting light signal passing through the liquid crystal lens by an image sensor to generate an image based on the light signal, wherein, when the liquid crystal lens is in the in-focus state, the image sensor generates an in-focus image of the light signal and, when the liquid crystal lens is in the out-of-focus state, the image sensor generates at least one out-of-focus image of the light signal as a reference image;
    receiving both the in-focus image and the reference image by an image processor;
    processing the in-focus image using the reference image to generate a processed image and deconvoluting the processed image to generate a final image based on:

$I_f - I_r = I_f^x * (\delta - h) + n$ wherein, $I_f^x$ represents the final image, $I_f$ represents the in-focus image, $I_r$ represents the reference image, * represents the convolution operator, δ represents an impulse response, h represents a blurring function and n represents a system noise of the liquid crystal lens imaging apparatus.

11. The liquid crystal lens imaging method according to 10, wherein, the processing the in-focus image using the reference image and the deconvoluting the processed image includes:
    using the reference image to remove an image generated by the interference light signal unmodulated by the liquid crystal lens in the in-focus image.

12. The liquid crystal lens imaging method according to claim 11, wherein, the processing the in-focus image using the reference image and the deconvoluting the processed image further includes:
    using an image generated by the light signal modulated by the liquid crystal lens in the reference image to process an image generated by the light signal modulated by the liquid crystal lens in the in-focus image.

13. The liquid crystal lens imaging method according to claim 10, wherein, the reference image is the at least one out-of-focus image generated by the liquid crystal lens in a lens state, and the blurring function h is determined by the following equation:

$$h(u, v) = \frac{1}{4\pi r^2} \prod \left(\sqrt{u^2+v^2}\right)$$

wherein, u presents a horizontal coordinate of the at least one out-of-focus image, v represents a vertical coordinate of the out-of-focus image, r presents a radius of a blur circle of the at least one out-of-focus image, and with $$\Pi\left(\sqrt{u^2+v^2}\right) = \begin{cases} 1, & \sqrt{u^2+v^2} < r \\ 0, & \sqrt{u^2+v^2} \geq r \end{cases}.$$

14. The liquid crystal lens imaging method according to claim 13, wherein, when the lens group is equivalent to an equivalent lens, the radius r of the blur circle of the at least one out-of-focus image is determined by:

$$r = as\left|\frac{1}{f} - \frac{1}{f_0}\right|$$

wherein, 2a represents an aperture of the equivalent lens, s represents a distance between the equivalent lens and the image sensor, $f_0$ represents an equivalent focal length of the equivalent lens when the in-focus image is generated, f represents an equivalent focal length of the equivalent lens when the at least one out-of-focus image is generated.

15. The liquid crystal lens imaging method according to claim 10, wherein, a time interval between the out-of-focus state of the liquid crystal lens corresponding to the reference image and the in-focus state of the liquid crystal lens corresponding to the in-focus image is less than a preset time interval.

16. The liquid crystal lens imaging method according to claim 10, further comprising:

when the in-focus image is generated based on a specified focus point, determining the in-focus image according to sharpness of image to obtain a focal area located at a same focal plane of the specified focus point, and using an image area corresponding to the focal area of the in-focus image in the at least one out-of-focus image to process the focal area of the in-focus image.

\* \* \* \* \*